United States Patent Office 3,136,737
Patented June 9, 1964

3,136,737
PROCESS OF PREPARING MIXED ETHYLENE POLYMERS OF HIGH MOLECULAR WEIGHT
Leonard W. F. Kampschmidt, Beek, Netherlands, assignor to Stamicarbon N.V., Heerlen, Netherlands
No Drawing. Filed June 1, 1959, Ser. No. 817,084
Claims priority, application Netherlands June 7, 1958
3 Claims. (Cl. 260—45.5)

The present invention relates to the preparation of mixed ethylene polymers of high molecular weight.

It is well known that ethylene polymers of high molecular weight can be obtained by carrying out the polymerization of ethylene at low pressures—below 100 atm.—by means of catalysts obtained by the reduction of a titanium tetrahalide with a reducing component consisting of a metal of the 1st–3rd groups of the periodic system, or a hydride or organometallic compound of such a metal. This reduction can be applied to titanium tetrafluoride, titanium tetrabromide and titanium tetraiodide, as well as to titanium tetrachloride; the catalyst preparation is mostly started from the last-mentioned substance.

Substances suitable as reducing components in this reduction are, for example, sodium, calcium and aluminum, while by also adding an alcohol, e.g., ethanol or butanol, the reaction with the titanium tetrahalide is promoted. Metals of high vapor pressure, such as cesium, have the advantage that they can be added in the vapor phase, hence, in a very finely divided state, together, for example, with an inert gas, such as nitrogen or argon. Apart from these metals, there can be used their hydrides, such as sodium hydride or cesium hydride, and their organometallic compounds, such as dimethyl magnesium, diethyl cadmium, dipropyl zinc, dihexyl zinc, methyl sodium and diphenyl cadmium. Especially suitable for this application are the aluminum compounds, such as diethyl aluminum hydride, di-isobutyl aluminum hydride, triethyl aluminum, tri-isobutyl aluminum, trihexyl aluminum, diethyl aluminum chloride, diethyl aluminum bromide, di-isobutyl aluminum chloride and dipropyl aluminum bromide.

Various ways of realizing the polymerization of ethylene by means of these catalysts have been described.

The reduction of the titanium tetrahalide is mostly carried out in a reduction zone, separately from the polymerization and the resulting catalyst, suspended in an inert liquid, is subsequently fed to the polymerization zone.

In another embodiment of the invention, a separate reduction zone is not used, but the titanium tetrahalide and the reducing component are separately dissolved in an inert liquid and the solutions are fed into the polymerization zone.

It has been found that the molecular weight of the ethylene polymers depends on the degree of reduction of the catalyst system used in the polymerization process. In this specification and in the appended claims, the expression "degree of reduction" denotes the percentage of titanium tetrahalide reduced by the reaction with the reducing component used.

By reason of the very high values of the molecular weight of the polymers, which values are difficult to determine exactly, there is measured instead the intrinsic viscosity of the polymers, a property which is closely related to the molecular weight and which lends itself better to accurate determination.

In this specification and in the appended claims, the term "intrinsic viscosity" denotes the number of decilitres of decalin, at a temperature of 135° C., in which one gram of polymer has to be dissolved in order to produce a solution having a viscosity twice as high as that of decalin at the same temperature.

At degrees of reduction of the catalyst of less than 80%, the intrinsic viscosity is only slightly sensitive to fluctuations in the degree of reduction during polymerization, so that polymers of constant quality are obtained. The polymers prepared at a degree of reduction lower than 80% have intrinsic viscosities lower than 2.5; generally, values between 1 and 2 are obtained, corresponding to a molecular weight of about 30,000–80,000.

The polymers obtained in this way are suitable for the preparation of films. However, for other applications, as cable sheathing and for the preparation of sheets or tubes, these polymers are unsuited. For these applications a higher intrinsic viscosity, 2.5–5, is required; for example, for sheets a value of 2.5 to 3, for cables 3–3.5, for tubes about 3.5, while for pressure molding objects, a value of 4–4.5 is required.

It is true that, if in the polymerization, the degree of reduction of the catalyst be raised to over 80%, higher values of the intrinsic viscosity are obtained but, in that case, the intrinsic viscosity is subject to wide variations, because in this range it is highly sensitive to small variations in the degree of reduction which are difficult to avoid in practice. Hence, polymers having a constant quality—an essential requirement for their practical use—cannot be obtained in this manner.

It has now been found that if the catalysts have a very high degree of reduction, 99–100%, the intrinsic viscosity is not sensitive to small variations in the degree of reduction, so that constant values of the intrinsic viscosity are obtained. However, the intrinsic viscosity of polymers produced in this way is very much higher than 10 amounting, for example, to 13, 15, 18 or 20, depending on the activity of the catalyst components used. Polymers having such high intrinsic viscosities are very difficult to use in practice.

It has now been found that in the preparation of ethylene polymers by polymerizing ethylene at low pressures—below 100 atm.—in the presence of catalysts obtained by the reduction of a titanium tetrahalide with a reducing component consisting of a metal of the 1st–3rd groups of the periodic system, or a hydride or organometallic compound of such a metal, while keeping the degree of reduction of the catalyst during the polymerization lower than 80%, mixed polymers having intrinsic viscosities rendering them suitable for practical application are obtained if, during the polymerization of afterwards, the polymers be mixed with ethylene polymers obtained by polymerizing ethylene in the manner described, but with a degree of reduction of the catalyst of 99–100%.

It was found that in the mixing of the polymers, the intrinsic viscosity is an additive quantity so that the mixing ratio to be employed, for obtaining a given desired intrinsic viscosity of the final product, can be derived from the values of the intrinsic viscosities of the polymers to be mixed.

The degree of reduction of the catalyst, which is determined by analysis, depends on various factors, such as the activity of the reducing component, the temperature during and the duration of the contact between the titanium tetrahalide and the reducing component and, in particular, is strongly influenced by the molecular ratio of the catalyst components used. To attain a degree of reduction lower than 80%, the titanium tetrahalide and the reducing component are mostly used in about equimolecular amounts, while in some cases, for example, if di-isobutyl aluminum chloride be used, a small excess of 0.1–0.2 mole of the reducing component is permissible.

In order to obtain a degree of reduction of the catalyst of 99–100%, a sufficient excess of the reducing component reacting with the titanium tetrahalide is used, so that the titanium tetrahalide is rapidly converted at a temperature of 50–90° C. In most cases, a degree of reduction of 100% is already reached after a short time if a molecular ratio of 1.5 moles of reducing component per mole of titanium tetrahalide be used; this happens very soon if there be used highly active reducing components, such as the dialkyl aluminum hydrides.

The polymerization is generally carried out at a temperature of 50–90° C., so that the resulting polymer does not soften and is obtained as a powdery product.

The control of the temperature can be facilitated by the use of an inert liquid as dispersion medium.

The inert liquid used can be a saturated hydrocarbon, such as hexane, heptane or cyclohexane. The use of other dispersion media, such as gasoline, kerosene, benzene, toluene and halogenated hydrocarbons, such as chlorobenzene, is also permissible. Mineral oil fractions and fractions of hydrocarbons obtained by synthesis from carbon monoxide and hydrogen can also be used. Other suitable dispersion media are mixtures of the above-mentioned substances. It is recommended that the dispersion medium be purified in order to avoid the presence of harmful substances, such as sulphur compounds and resinifiable compounds.

The polymers obtained by maintaining a low degree of reduction of titanium tetrachloride, less than 80%, and the polymers prepared at a high degree of reduction of 99–100%, can be mixed in various ways. For example, if a dispersion medium be used, then, the polymer suspension obtained as the product of the polymerization in which a catalyst with a high degree of reduction is used, can be fed into the polymerization zone in which polymerization is carried out with a low degree of reduction. Conversely, a polymer suspension obtained by the use of a low degree of reduction can be introduced into a polymerization zone in which polymerization is carried out with a high degree of reduction. If these ways of mixing be used, then account should be taken of the presence of catalysts in the polymer suspension supplied, in controlling the degree of reduction by the addition of catalyst components.

Instead of feeding a polymer suspension into another polymerization zone, it is also possible to use a single polymerization zone in which polymerization is started with a catalyst having a low degree of reduction and is afterwards continued with a catalyst of high degree of reduction; conversely, the high degree of reduction can be used first, the low degree of reduction afterwards.

Mixing can also be effected by adding together polymer suspensions, before, during, or after the purification treatments. It is also possible to mix polymer powders, and to use mixing rollers or other mixing appliances of mixing at elevated temperature.

The purification of the polymers in order to remove the catalyst residues can be effected in a conventional way, e.g., by means of alcohols and water-washing, while the liquids separated off can be used again after removing the impurities and by products dissolved therein.

The ethylene to be polymerized need not be pure; gases which, besides ethylene, contain other substances, such as propylene and small amounts of oxygen and/or moisture, can also be used. Furthermore, the ethylene can be mixed with gases, such as hydrogen, nitrogen and saturated hydrocarbons.

The process according to the invention, which can be carried out both continuously and batchwise, makes it possible to prepare polymers of constant quality and, at the same time, avoid the necessity of working with degrees of reduction falling within the range where it is difficult to control the intrinsic viscosity values desired of the resultant polymers; these values, which are important for the use of the polymers, could heretofore only be attained within the range that is difficult of control.

*Example 1*

A solution of di-isobutyl aluminum chloride in light gasoline (boiling range 60–85° C.) having a concentration of 16 millimoles per litre, is continuously introduced into a stirred vessel. Into the same vessel is also introduced a solution of titanium tetrachloride in light gasoline, having a concentration of 16 millimoles per litre. While the temperature in the vessel is maintained at 70–75° C. and the pressure at 2–2.5 atm., ethylene is fed into the stirred vessel and polymerized therein. The resulting polymer suspension is continuously removed from the stirred vessel.

The supply of the catalyst components is so controlled that 1.0 mole of aluminum compound and 15 kg. of ethylene are supplied per mole of titanium tetrachloride.

The removal of the polymer suspension is so controlled that the residence time in the vessel is about 4 hours, and the concentration of the polymer in the suspension is maintained at 100–150 grams per litre of suspension.

The degree of reduction of the titanium tetrachloride in the vessel is 65–70%.

The polymer has an intrinsic viscosity of 1.4–1.8. The polymerization efficiency with respect to ethylene is 98%.

In another stirred vessel, ethylene is polymerized with a catalyst system consisting of di-isobutyl aluminum hydride and titanium tetrachloride, with light gasoline as dispersion medium, under the following reaction conditions:

Di-isobutyl aluminum hydride_ conc. 12 millimoles per litre of gasoline.
Titanium tertachloride_____. conc. 6 millimoles per litre of gasoline.
Al/Ti ratio_____ 2 moles of Al per mole of Ti.
Ethylene supply_____ 15 kg. per mole of Ti.
Temperature_____ 70–75° C.
Pressure_____ 1.5 atm.
Residence time_____ about 4 hours.
Polymer suspension_____ 100–150 g. of polymer per litre.
Degree of reduction of catalyst _____ 100%.
Intrinsic viscosity of polymer_ 15–16.
Polymerization efficiency with respect to ethylene_____ 98%.

The resulting two polymer suspensions are added together in a ratio of 7:1 and mixed. Subsequently, the catalyst residues are removed by dispersing methanol in the mixed suspension and then washing the suspension with water. After removal of the dispersion medium, a polymer is obtained which has an intrinsic viscosity of 3–3.5, which corresponds to a mean molecular weight of about 150,000–200,000.

The polymer is suited for cable insulation sheathings and for the production of tubes.

*Example 2*

In the manner described in Example 1, ethylene is polymerized with hexane as dispersion medium, under the following reaction conditions:

Di-isobutyl aluminum chloride___. conc. 19.2 millimoles per litre of hexane.
Titanium tetrachloride_____ conc. 16 millimoles per litre of hexane.
Al/Ti ratio_____ 1.2 moles of Al per mole of Ti.
Ethylene supply_____ 15 kg. per mole of Ti.
Temperature_____ 75° C.
Pressure_____ 2.3–2.4 atm.
Residence time_____ about 5 hours.
Polymer suspension_____ 100–150 g. per litre.
Degree of reduction of catalyst___ 72–75%.
Intrinsic viscosity of polymer_____ 1.7–2.0.
Polymerization efficiency with respect to ethylene_____ 99%.

At the same time ethylene is polymerized under the following conditions:

| | |
|---|---|
| Di-isobutyl aluminum hydride | conc. 9 millimoles per litre of hexane. |
| Titanium tetrachloride | conc. 6 millimoles per litre of hexane. |
| Al/Ti ratio | 1.5 moles of Al per mol of Ti. |
| Ethylene supply | 15 kg. per mole of Ti. |
| Temperature | 70° C. |
| Pressure | 1.4–1.7 atm. |
| Residence time | about 3 hours. |
| Polymer suspension | 100–150 g. of polymer per litre. |
| Degree of reduction of catalyst | 100%. |
| Intrinsic viscosity of polymer | 12–13. |
| Polymerization efficiency with respect to ethylene | 99%. |

The resulting two polymer suspensions are so mixed, that 1/10 of the mixed suspension consists of polymer suspension obtained with the use of the catalyst system having the high degree of reduction. In this way, a final product is obtained with an intrinsic viscosity of 2.5–3 (molecular weight about 120,000–150,000). This product is suitable for the preparation of sheets.

*Example 3*

A suspension of ethylene polymer in light gasoline, having a concentration of 110–120 grams per litre, which was obtained continuously, in accordance with Example 1, with the use of a catalyst of a low degree of reduction, is transferred to another stirred vessel in which the temperature is kept at 70–75° C., the pressure at 2–2.5 atm. and into which is fed ethylene. By adding a solution of diisobutyl aluminum chloride in light gasoline (concentration of 4 millimoles per litre of gasoline) in an amount of 1 litre of solution per litre of polymer suspension supplied, the molecular Al/Ti ratio in the stirred vessel is maintained at 1.5. The ethylene supply is adjusted at 15 kg. of ethylene per mole of titanium compound contained in the stirred vessel.

The discharge of the polymer suspension from the stirred vessel is so controlled, that the residence time in the vessel is about 4 hours and the concentration of the polymer in the suspension is maintained at 190–200 grams per litre of suspension.

The degree of reduction of the titanium tetrachloride in the vessel is 100%. The polymerization efficiency with respect to ethylene is 98%.

The resulting polymer suspension is purified in the way described in Example 1. The final product has an intrinsic viscosity of 4–4.5 (molecular weight about 250,000–300,000) and can be used for pressure molding objects.

No claim is made herein to the broad inventive features of the process of preparing at low pressures ethylene polymers using a reduced titanium tetrachloride of a controlled degree of reduction, as this is the subject of claims in the copending application, Serial No. 817,086 filed concurrently herewith in the name of Leonard W. F. Kampschmidt and entitled: "Process of Preparing at Low Pressure Ethylene Polymers Having a Molecular Weight Lower Than 100,000," and assigned to the same assignee as the present application.

I claim:
1. Process of preparing mixed polymers of ethylene comprising the steps of: forming a first catalyst system by reacting titaniumtetrachloride and a reducing component selected from the group consisting of trialkyl aluminum, dialkyl aluminum chloride and dialkyl aluminum hydride, the alkyl-group therein having 2 to 4 carbon atoms; allowing the reduction to proceed until more than 20 mol percent of the titanium is still unreduced; polymerising ethylene at a pressure below 100 atmospheres in the presence of said first catalyst system thus formed to obtain a first polymer; forming a second catalyst system by repeating the above catalyst formation but allowing the reduction to proceed until less than 1 mol percent of the titanium is still unreduced; mixing said first polymer with said second catalyst system, and polymerising ethylene at a pressure below 100 atmospheres in the presence of said second catalyst system and in the presence of said first polymer to obtain a second polymer mixed with said first polymer.

2. Process of preparing polymer products of ethylene comprising the steps of: forming a first catalyst system by reacting titanium tetrachloride and a reducing component selected from the group consisting of trialkyl aluminum, dialkyl aluminum chloride and dialkyl aluminum hydride, the alkyl group therein having 2 to 4 carbon atoms; allowing the reduction to proceed until less than 1 mol percent of the titanium is still unreduced; polymerising ethylene at a pressure below 100 atmospheres in the presence of said first catalyst system thus formed to obtain a first polymer; forming a second catalyst system by repeating the above catalyst formation but allowing the reduction to proceed until more than 20 mol percent of the titanium is still unreduced; mixing said first polymer with said second catalyst system, and polymerising the ethylene at a pressure below 100 atmospheres in the presence of said second catalyst system and in the presence of said first polymer to obtain a polymer product.

3. Process of preparing mixed polymers of ethylene comprising the steps of: forming a catalyst system by reacting titanium tetrachloride and a reducing compound selected from the group consisting of trialkyl aluminum, dialkyl aluminum and dialkyl aluminum hydride, the alkyl group therein having 2 to 4 carbon atoms; allowing the reaction to proceed until more than 20 mol percent of the titanium is still unreduced; polymerizing ethylene at a pressure below 100 atmospheres in the presence of the catalyst system thus formed to obtain a first polymer; adding to the first-formed polymer suspension a solution of said reducing compound; allowing the reaction to proceed until less than 1 mol percent of the titanium is still unreduced by the reducing compound; adding additional ethylene while maintaining pressure in the vessel below 100 atmospheres to yield a final product having an intrinsic viscosity of 2.5–5.

References Cited in the file of this patent

UNITED STATES PATENTS

| | | |
|---|---|---|
| 2,691,647 | Field et al. | Oct. 12, 1954 |
| 2,837,496 | Vandenberg | June 3, 1958 |
| 2,905,661 | Muehlbauer et al. | Sept. 22, 1959 |
| 2,956,035 | Mock | Oct. 11, 1960 |

FOREIGN PATENTS

| | | |
|---|---|---|
| 768,680 | Great Britain | Feb. 20, 1957 |
| 790,115 | Great Britain | Feb. 5, 1958 |
| 540,459 | Belgium | Aug. 31, 1955 |

UNITED STATES PATENT OFFICE
CERTIFICATE OF CORRECTION

Patent No. 3,136,737            June 9, 1964

Leonard W. F. Kampschmidt

It is hereby certified that error appears in the above numbered patent requiring correction and that the said Letters Patent should read as corrected below.

Column 6, line 41, after "aluminum", first occurrence, insert -- chloride --.

Signed and sealed this 20th day of October 1964.

(SEAL)
Attest:

ERNEST W. SWIDER
Attesting Officer

EDWARD J. BRENNER
Commissioner of Patents